(12) United States Patent
Chuang et al.

(10) Patent No.: US 8,949,429 B1
(45) Date of Patent: Feb. 3, 2015

(54) CLIENT-MANAGED HIERARCHICAL RESOURCE ALLOCATION

(75) Inventors: James Hsiaosung Chuang, Issaquah, WA (US); Morgan K. Akers, Kirkland, WA (US); Jacob S. Carr, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 301 days.

(21) Appl. No.: 13/336,819

(22) Filed: Dec. 23, 2011

(51) Int. Cl.
*G06F 15/173* (2006.01)
*G06F 9/46* (2006.01)
*G06F 9/50* (2006.01)

(52) U.S. Cl.
CPC ............... *G06F 9/50* (2013.01); *G06F 9/5044* (2013.01)
USPC ............ 709/226; 709/224; 718/100; 718/104

(58) Field of Classification Search
USPC ......................................................... 709/224
See application file for complete search history.

(56) References Cited

U.S. PATENT DOCUMENTS

| | | | | |
|---|---|---|---|---|
| 7,412,398 | B1* | 8/2008 | Bailey ........................... | 705/7.31 |
| 7,577,667 | B2* | 8/2009 | Hinshaw et al. ...................... | 1/1 |
| 7,634,477 | B2* | 12/2009 | Hinshaw ............................... | 1/1 |
| 7,984,445 | B2* | 7/2011 | Benedetti ....................... | 718/102 |
| 8,046,737 | B2* | 10/2011 | Wittenberg et al. .......... | 717/109 |
| 8,078,728 | B1* | 12/2011 | Pollan et al. ................... | 709/226 |
| 8,195,800 | B2* | 6/2012 | Tameshige et al. ............ | 709/225 |
| 8,533,677 | B1* | 9/2013 | Pleis et al. ..................... | 717/121 |
| 2002/0059274 | A1* | 5/2002 | Hartsell et al. ................. | 707/100 |
| 2002/0095400 | A1* | 7/2002 | Johnson et al. .................... | 707/1 |
| 2002/0116251 | A1* | 8/2002 | Chen et al. ........................ | 705/10 |
| 2002/0152305 | A1* | 10/2002 | Jackson et al. ................. | 709/224 |
| 2002/0174227 | A1* | 11/2002 | Hartsell et al. ................ | 709/226 |
| 2002/0174422 | A1* | 11/2002 | Kelley et al. ................... | 717/178 |
| 2003/0046396 | A1* | 3/2003 | Richter et al. ................. | 709/226 |
| 2003/0177176 | A1* | 9/2003 | Hirschfeld et al. ............ | 709/203 |
| 2004/0181794 | A1* | 9/2004 | Coleman et al. .............. | 718/104 |
| 2005/0091346 | A1* | 4/2005 | Krishnaswami et al. ...... | 709/220 |
| 2005/0108717 | A1* | 5/2005 | Hong et al. .................... | 718/102 |
| 2005/0149935 | A1* | 7/2005 | Benedetti ....................... | 718/102 |
| 2005/0278453 | A1* | 12/2005 | Cherkasova ................... | 709/231 |
| 2006/0080666 | A1* | 4/2006 | Benedetti et al. ............. | 718/104 |
| 2006/0168166 | A1* | 7/2006 | Hardwick et al. ............. | 709/221 |
| 2006/0248448 | A1* | 11/2006 | Williams et al. .............. | 715/513 |
| 2006/0248450 | A1* | 11/2006 | Wittenberg et al. ........... | 715/513 |
| 2007/0005330 | A9* | 1/2007 | Hardwick et al. .............. | 703/22 |
| 2007/0240162 | A1* | 10/2007 | Coleman et al. .............. | 718/104 |
| 2008/0168424 | A1* | 7/2008 | Mohindra et al. ............. | 717/120 |
| 2008/0201705 | A1* | 8/2008 | Wookey ......................... | 717/175 |
| 2008/0271039 | A1* | 10/2008 | Rolia et al. .................... | 718/105 |

(Continued)

*Primary Examiner* — David Lazaro
*Assistant Examiner* — Robert Shaw
(74) *Attorney, Agent, or Firm* — Lee & Hayes, PLLC

(57) ABSTRACT

A host may provide a client-managed hierarchical resource allocation. In some aspects, a host may analyze a computing system including a plurality of computing resources to identify, for various tasks, dependencies between the computing resources. The host may receive a new task to be performed by the computing system. The new task may be associated with a similar task performed by the computing system to enable modeling the new task using dependencies between computing resources which are determined from the similar task. The host may receive an estimate of computing resources required by the new task. The host may then allocate at least a portion of the computing resources to perform the new task based on the estimated workload of the new task and similarities between the new task and the similar task.

20 Claims, 6 Drawing Sheets

(56) References Cited

U.S. PATENT DOCUMENTS

| | | | |
|---|---|---|---|
| 2008/0307420 A1* | 12/2008 | Benedetti | 718/102 |
| 2009/0119301 A1* | 5/2009 | Cherkasova et al. | 707/10 |
| 2009/0157419 A1* | 6/2009 | Bursey | 705/1 |
| 2010/0031226 A1* | 2/2010 | Chaar et al. | 717/101 |
| 2010/0042721 A1* | 2/2010 | Steinder et al. | 709/226 |
| 2010/0076835 A1* | 3/2010 | Silverman | 705/14.33 |
| 2010/0161282 A1* | 6/2010 | Bell et al. | 702/186 |
| 2010/0223385 A1* | 9/2010 | Gulley et al. | 709/226 |
| 2010/0250642 A1* | 9/2010 | Yellin et al. | 709/201 |
| 2010/0257513 A1* | 10/2010 | Thirumalai et al. | 717/134 |
| 2010/0325632 A1* | 12/2010 | Guccione et al. | 718/102 |
| 2013/0055278 A1* | 2/2013 | Zaitsev | 718/104 |
| 2013/0160003 A1* | 6/2013 | Mann et al. | 718/1 |

\* cited by examiner

CLIENT-MANAGED HIERARCHICAL RESOURCE ALLOCATION

BACKGROUND

Sophisticated computing systems often rely on some or many different computing resources in order to perform a large number of processes. These systems may include various dependencies, which require use of at least a portion of the computing resources when performing certain tasks. For example, in a retail system, a primary computing resource may rely on other computing resources such as inventory resources, delivery resources, ordering resources, and/or other computing resources when conducting a transaction for an item.

As demand on a computing system grows over time, administrators typically perform a manual process to determine which computing resources are in need of expansion, replacement, or reallocation. Often, these decisions are performed without knowledge of all processes or perspective processes performed by the computing resources and without a complete understanding of all dependencies included across the computing system. For example, an administrator may add capacity to a first computing resource only to later find that throughput is limited due to a capacity constraint caused by a second computing resource.

Sometimes special events may trigger a spike or surge in a demand for the computing resources, such as after a highly anticipated item is offered for sale and many customers attempt to order the item. In these instances, the computing resources may experience high levels of utilization, which may lead to failure when the resources are overloaded with requests.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
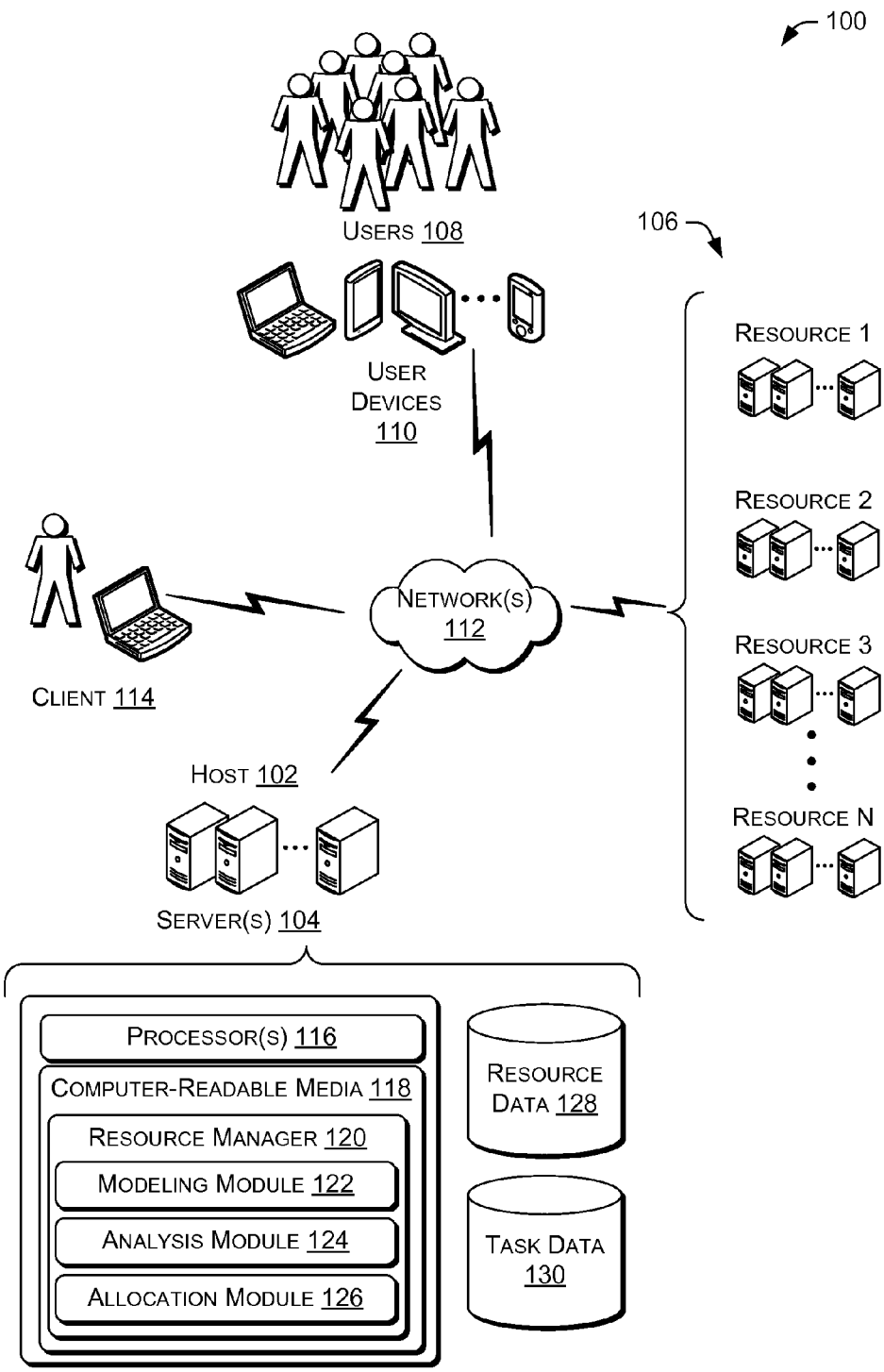
FIG. 1 is a schematic diagram of an illustrative computing environment that enables client-managed hierarchical resource allocation.

This disclosure is directed to, among other things, providing client-managed hierarchical resource allocation. In accordance with various embodiments, a host may analyze a computing system that includes a plurality of computing resources to identify, for various tasks, dependencies between each of the plurality of computing resources when performing each of the various tasks. For example, the computing system may be an electronic marketplace and the various computing resources may include an order processing resource, an inventory control resource, and so forth. In another example, the computing system may be a reservation system and the various computing resources may include a flight availability resource, a hotel availability resource, a rental car availability resource, and so forth. Other types of computing systems may include, without limitation, a financial services system and a digital media distribution system.

The host may receive a new task to be performed by the computing system. In some instances, the new task may be an existing task that may be performed at a higher volume (more frequently) than historical performance. In various instances, the new task may be a new combination of tasks that have not been performed by the computer system in the past, although parts of the new task may be regularly performed by the computing system. The new task may be associated with a similar task performed by the computing system to enable modeling the new task using dependencies between computing resources which are determined from the similar task. When the new task is an existing task, the association may simply draw from prior history of the existing task. However, when the new task is not an existing task, then the association may take into account various attributes of the task to perform the association.

The host may receive an estimate of computing resources required by the new task. For example, the estimate may include a relative estimate that estimates an increase in computational workload over a previous computational workload of the existing task (e.g., an X percent increase in a number of transactions, etc.). The estimate may also be an independent estimate, which may estimate on a number of transactions, an amount of computations, or other metrics that are indicative of the computational workload of the computing resources that is expected for the new task.

The host may then allocate at least a portion of the computing resources to perform the new task based on the estimated workload of the new task and similarities between the new task and the similar task. Thus, the host may draw from prior experience and analysis of the computing system and the computing resources to determine which of the computing resources are needed to perform the new task and how much computational workload each of the computing resources can expect to process.

In some embodiments, the host may provide a cost analysis for various estimates of the computing resources required by the new task. The host may also enable prioritization of the various tasks and the new task, which may be used in an event that the estimate is incorrect and the computing resources are subject to overuse and/or experience limited capacity.

The techniques and systems described herein may be implemented in a number of ways. Example implementations are provided below with reference to the following figures.

Illustrative Environment

FIG. 1 is a schematic diagram of an illustrative computing environment 100 that enables client-managed hierarchical resource allocation. The environment 100 includes a host 102 having servers 104 that manage, at least in part, allocations of computing resources 106 that serve content to users 108, via user devices 110, in response to requests from the users. The resources 106 may representative of any type of data service that provides information to the users 110 (possibly including entities) such as and without limitation an electronic marketplace, a digital media distributor, a financial services provider, and/or other types of data services. The resources 106 may be a dependency-based hierarchical arrangement of computing resources that work together to some extent to provide data to the user devices 110 in response to a request. For example, a primary resource may request data from secondary resources in order to fulfill the request. Many dependencies and/or interrelationships may exist between the resources, which require cooperation, timing, and communication between the various resources. The resources 106 may be commonly owned and managed or may be owned and/or managed by different entities.

The servers 104 may be in communication with the resources 106 via one or more network(s) 112. The network(s) 112 may include wired and/or wireless networks including without limitation, the Internet, mobile telephone networks, Wi-Fi, local area networks (LANs), wide area networks (WANs), and/or other types of networks that enable an exchange of data. The network(s) may also be used to transmit data between the resources 106 and/or the user devices 110.

The servers 104 may also be in communication with a client 114 via the network(s) 112. The client 114 may request use of at least some of the resources 106 to enable providing data to the user devices 110. For example, the client 114 may desire to use at least some of the resources 106 to host a sale of an item. By hosting the sale, the multiple of the resources may be used to perform various activities, such as to process orders, check inventory, schedule shipments, perform payment transactions, schedule shipments, and so forth. Thus, the client 114 may interact with the host 102 via the servers 104 to use or access at least some of the resources 106.

The servers 104 may include processors(s) 116 and computer-readable media 118. The computer-readable media 118 may store various modules, applications, programs, or other data. The computer-readable media 118 may include instructions that, when executed by the processor(s) 116, cause the processors to perform the operations described herein for the host 102. In some embodiments, the computer-readable media 118 may store a resource manager 120 that may include a modeling module 122, an analysis module 124, and an allocation module 126. The servers 104 may read/write data to/from resource data 128 and/or task data 130 during execution of the various modules. Each of the modules is discussed in turn.

The modeling module 122 may create and maintain a model representative of the resources 106 and various dependencies and interrelationships between the resources. For example, the resources may process requests (perform tasks) in a hierarchical structure, where a primary resource makes calls (requests) to other resources (e.g., secondary resources, etc.) to perform portions of the task or other related tasks. The modeling module 112 may determine these relationships and store the relationships as the resource data 128. The modeling module 122 may also store attributes of the resources 106 to an extent possible. The attributes may include capacity of a resource, expandability of a resource, current workload of a resource, and other possible attributes. The attributes may be determined based on analysis of software instructions and/or hardware specifications, and/or through receipt of user input.

The analysis module 124 may analyze activity of the resources 106 to identify and monitor tasks that are performed by the resources. The analysis module 124 may store task information as the task data 130. For example, the analysis module 124 may determine that a group of the resources 106 are used to offer a product for sale and process orders for the product on an electronic marketplace. The analysis module 124 may determine resources used to perform various tasks, possibly via the modeling module 120 and the resource data 128, a capacity of the resources used to perform a given amount of work (e.g., how many transactions per second, etc.), and other metrics related to the tasks.

The allocation module 126 may allocate at least some of the resources for performance of a new task or a group of tasks. For example, the client 114 may desire to increase availability of some of the resources 106 to support a new product promotion, which the client expects to increase user activity by fifty percent (50%) for a given time period. Through use of the task data 130 and resource data 128, the allocation module 126 may determine an allocation of the resources necessary to support the new product promotion, which may or may not include expanding capacity of some of the resources. In some embodiments, the allocation module 130 may prioritize at least some of the tasks to enable processing of some tasks over other tasks when some of the resources are running near or at full capacity.

Illustrative Operation

Figure 2:
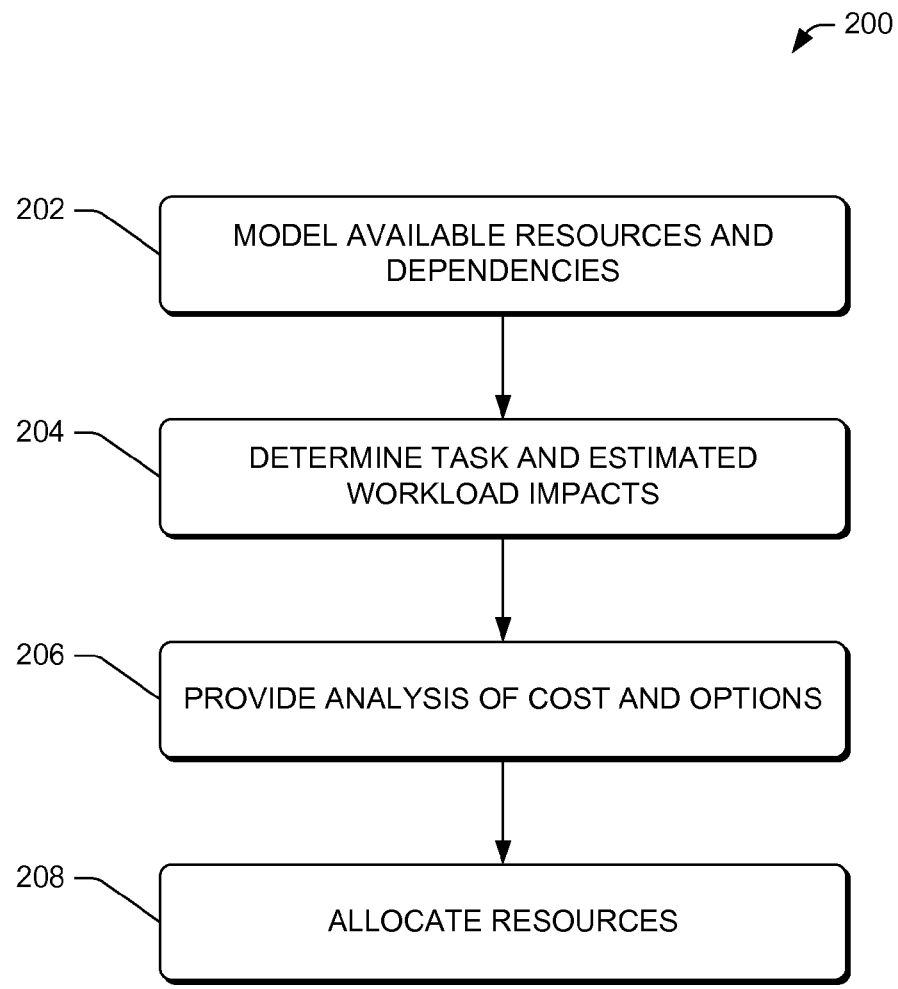
FIG. 2 is a flow diagram of an illustrative process to provide client-managed hierarchical resource allocation.

FIG. 2 is a flow diagram of an illustrative process to provide client-managed hierarchical resource allocation. The process 200 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

The process 200 is described with reference to the environment 100 and may be performed by the host 102 via the servers 104. Of course, the process 200 (and other processes described herein) may be performed in other similar and/or different environments.

At 202, the modeling module 122 may model the resources 106. A model of the resources may include any dependencies and/or interrelationships between the various resources 106. The modeling module 122 may store the data as the resource data 128. In some embodiments, the modeling module may create the model, at least in part, by analyzing data dependencies that exist for given tasks to determine which resources are used for which tasks. Once the resources are identified, the modeling module 122 may determine other attributes about the resources, such as a location of each of the resources, a capacity of each of the resources, an ability or lack of ability to expand the capacity of each of the resources, and/or other limitations of each of the resources.

At 204, the analysis module 124 may determine a task to be performed by the resources 106 or a portion of the resources. The analysis module 124 may receive a definition of the task and estimates of workload impacts from the client 114. For example, the client 114 may desire to launch a new electronic service using the resources 106. The client 114, or possibly the host 102, may associate the new electronic service with an existing electronic service that is similar in inputs, outputs, use of the resources 106, and/or similar in other ways. The estimates may be provided as estimated user transactions, estimated user hits (user interactions with an initial server, etc.), estimated resource hours, or other types of estimated metrics. In some embodiments, the estimates may be relative estimates that provide an estimated increase (or possibly a decrease) in user activity. For example, the client 114 may indicate that the new electronic service is projected to lead to a twenty five percent (25%) increase in users, based on transactions, as compared to a similar task that is currently performed by the resources.

At 206, the analysis module 124 may provide an analysis of costs associated with the task and estimated workload. For example, when the client 114 request processing of the new electronic service having an increase of 25%, then costs may include deployment of the resources, opportunity costs, expansion costs, and other types of costs associated with implementation and ongoing maintenance of the new electronic service.

The analysis module 124 may also provide additional options for the client 114. For example, the analysis module 124 may plot various scenarios (estimates) for the new electronic service, such as a 10% increase, a 15% increase, a 20% increase, a 30% increase, and so forth, each associated with respective costs. By providing different estimates, the analysis module 124 may enable the client 114 to control costs by selecting an estimate that does not require expansion costs to a resource, is performed via batch processing during non-peak time, or otherwise reduces costs or demands on the resources.

In some embodiments, the allocation module 126 may also provide priority values for the various tasks, which may be used to determine whether the new task (the new electronic service) can be processed when the new task exceeds a selected estimate workload impact. For example, when the estimated workload impact is selected as 25%, and the actual workload impart exceeds 25%, then the priority values may be used to determine whether the new task can support additional users (e.g., greater than the 25%) or whether the new task may be throttled or may become unavailable because the new task has a lower priority than other tasks. The priorities may be limited to time periods or other restrictions, which may enable tailoring of the priorities to provide the new task for a specific implementation, such as a promotion, a product lunch, a service launch, and so forth.

At 208, the allocation module 126 may allocate capacity of at least some of the resources to perform the new task based at least in part on the model, via the resource data 128, and the task and estimates from the operation 206, via the task data 130. The allocation module 126 may then monitor processing (execution) of the new task, which may then be used to refine estimates, adjust attributes of the resources, revise or update the model, and so forth. In accordance with various embodiments, the process 200 may be repeated for a next task and may use an updated model of the available resources based on newly implemented and/or newly retired tasks.

Illustrative Resource Model

Figure 3:
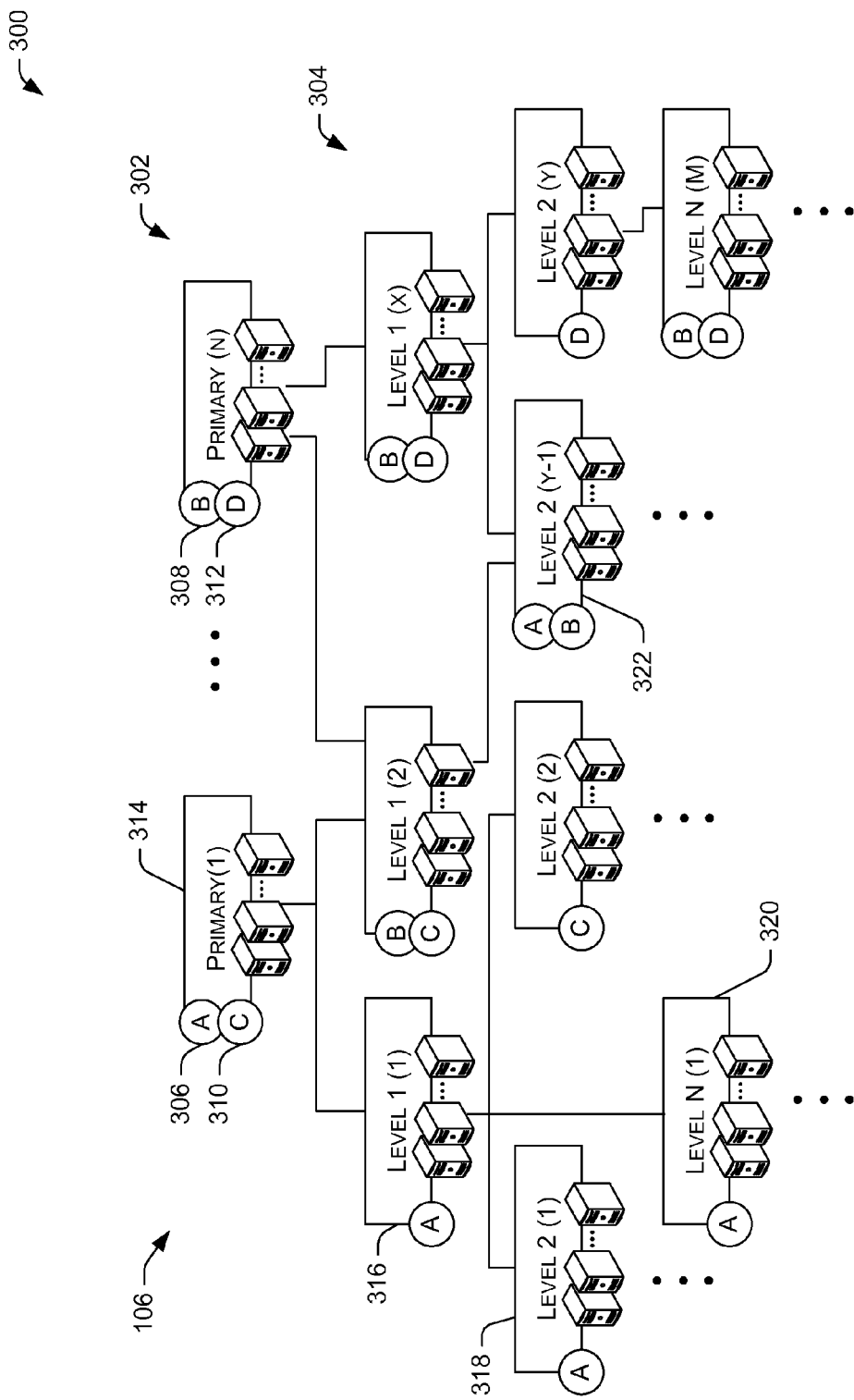
FIG. 3 is a schematic diagram of an illustrative model of a computing system, which may be managed by a client to allocate resources.

FIG. 3 is a schematic diagram of an illustrative model 300 of a computing system, which may be managed by a client to allocate resources. The model 300 may be arranged as a hierarchy or other type of structure, which includes dependencies between various resources in the structure. The model 300 may represent a graphical depiction of at least some of the resource data 128, including the identity of the resources 106 and dependencies between the resources.

Referring to FIG. 3, the resources 106 may include primary resources 302, such as primary (1) . . . (n). Although two primary resources are shown, any number of primary resources may be included in the resources 106. The primary resources 302 may be a main or initial resource used to perform a task. For example, the primary resources 302 may exchange data with the users 108, via the user devices 110, and exchange data with other resources to perform the tasks. In an electronic marketplace, one of the primary resources 302 may host the electronic website. That primary resource may exchange data with other resources 304 to determine prices of items, availability of items, perform transactions, schedule deliveries, and/or perform other tasks.

The resources 106 may include dependencies between various resources, which may be necessary to perform specific tasks. As shown in FIG. 3, the primary resources 302 may perform illustrative tasks A 306, B 308, C 310, and D 312. In order to perform task A 306, a primary resource "primary (1)" 314 may need to exchange data with at least the following resources: "level 1(1)" 316, "level 2(1)" 318, "level N(1)" 320, "level 2(y−1)" 322, and possibly other resources. The various other resources 304 may be located in different regions, owned and/or managed by different entities, and so forth. Some of the other resources 304 may be used by other ones of the primary resources 302. This mapping and association of the resources 106 that includes the dependencies is referred to herein as the model 300 or "resource model." This model may be created and maintained at least in part by the modeling module 122, which may determine which resources are used to perform functions for each task. This may be performed by analyzing software instructions, hardware specifications, network configurations, and/or by receiving user input.

As discussed above, the analysis module 124 may analyze and determine the tasks that are performed by the resources 306. For example, the analysis module 124 may identify that the tasks A 306, B 308, C 310, and D 312 are performed by the resources configured in the resource model. After the analysis module 124 determines the tasks and dependencies, which may be performed in part by the modeling module 122, the analysis module 124 may store the results as the task data.

When a new task is requested to be performed by the client 114, the analysis module 124 may determine, possibly from input from the client 114, which existing tasks are similar to the requested task. For example, the client 114 may request to perform a task that is the same as task A 306, but includes a 50% increase in transactions for a four hour period of time. The analysis module 124 and allocation module 126 may use these inputs to determine which resources will be impacted (used) to perform this requested task, resulting capacity, bottlenecks, resources needing expansion, resource limitations, and so forth. The allocation module 126 may attempt to resolve any issues that prevent performing the requested task, which may impact processing of existing tasks. Possible issues may include capacity limitations, processing bottlenecks, and so forth.

In another example, the client 114 may request a new task that is similar to task C 310, but not identical. For example, the client 114 may request to that the resources 106 provide a sale of an item and offer home installation. The processing of the new task may include most or all of the operations included in task C and may include some new operations, such as scheduling the home installation. The client may also estimate that the new task is going to average ten transactions per minute. Thus, the analysis module 124 and the allocation module 126 may use the resource model to implement the new task, which again may require the allocation module 126 to attempt to resolve any issues that prevent performing the requested task, which may impact processing of existing tasks.

In yet another example, the client 114 may request a new task that includes elements of tasks B 308 and D 312. The client may estimate the workload for the new task as a relative value, in transactions per time period, or in other suitable ways. The analysis module 124 and the allocation module 126 may use the resource model to implement the new task, which again may require the allocation module 126 to attempt to resolve any issues that prevent performing the requested task, which may impact processing of existing tasks.

Figure 4:
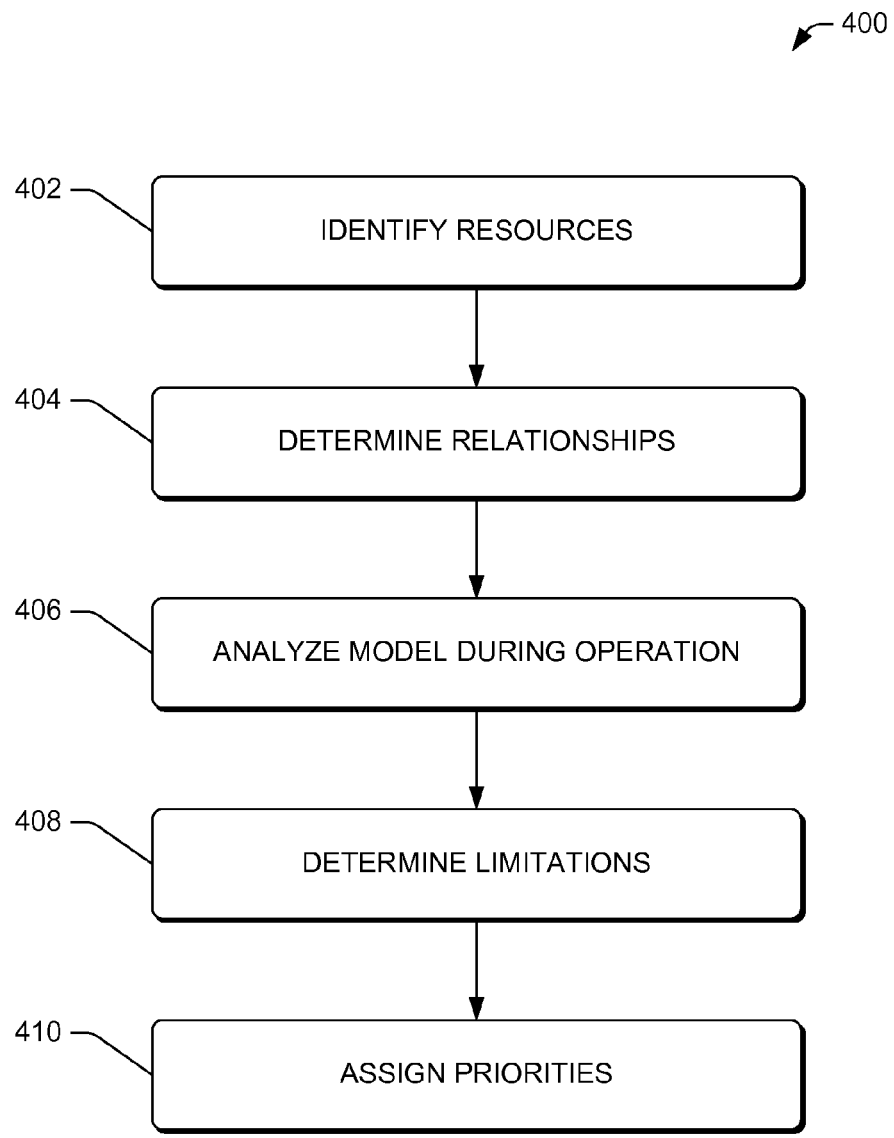
FIG. 4 is a flow diagram of an illustrative process to analyze a computing system and model dependencies between various computing resources.

FIG. 4 is a flow diagram of an illustrative process 400 to analyze a computing system and model dependencies between various computing resources. The process 400 may be used to create and maintain the resource data 128.

At 402, the modeling module 122 may identify the resources that are available to perform various tasks. For example, the modeling module 122 may analyze software instructions, network configurations, and/or other data, and possibly receive user input as to the identity of the resources.

At 404, the modeling module 122 may determine relationships between the various resources. The relationships may be the interconnections, exchanges of data, and other communications between the resources. On a task-by-task basis, the relationships may be the dependencies. For example, for a specific task, a primary resource may include a dependency of another resource. This dependency and other dependencies may be included in the relationships between the resources included in the resource model.

At 406, the analysis module 124 may analyze operation of the resource model, which is created from the operations 402 and 404. The analysis module 124 may determine task specific information, such as the dependencies between resources for a specific task, workload demands for a specific task, and other metrics associated with a specific task, which may be stored as the task data 130.

In some embodiments, the analysis module 124 may test different variables or may test different scenarios to evaluate and record system and/or resource performance. The analysis module 124 may use this information to make predictions about the resources operation, such as to determine capacity limits, latency, and other attributes of the various resources.

At 408, the analysis module 124 may determine existing limitations of the resources based at least in part on the analysis of the model. The existing limitations may be determined prior to creation of a new task, thus enabling determination of current state limitations. For example, the analysis module 124 may determine that a particular resource is heavily used by certain tasks during a particular time period. The analysis module 124 may determine that this resource may be unable to process additional work without added capacity. In some instances, the particular resource may be necessary for a new task, but not initially apparent to the client 114 as being necessary for the new task. Thus, by creating the model and analyzing the model during operation, the process 410 may determine limitations and areas where resources may need expansion, workload shifting, or other adjustments to process new work while maintaining current processes. In accordance with various embodiments, the existing limitations may include administrator based limitations. For example, an administrator may blacklist a resource to prevent the resource from receiving any new tasks. In some instances, these limitations may be discoverable by solicitation and/or interaction with the various administrators of the resources.

At 410, the allocation module 126 may assign priorities to at least some of the tasks. The priorities may be used to decide which tasks should be performed when capacity of a resource becomes scarce. For example, when a particular resource has little or no additional capacity to process work, then the particular resource may process work having a higher priority. The priority may be assigned to each task based on various factors. For example, a task may include a priority level for a first throughput rate (e.g., up to a threshold number of transactions per second), and then a second priority for a second throughput rate (e.g., more that the threshold number of transaction per second). This may enable processing of a new task up to (or beyond) an estimated workload, while providing some assurances that the new task will not prevent existing tasks from being performed. Further, the priorities may be specific to resources. The priorities may be assigned by the allocation module 126, possibly after receipt of user input. In some instances, the priorities may be adjusted when new tasks are requested to be performed by the resources 106.

Illustrative Task Allocations

Figure 5:
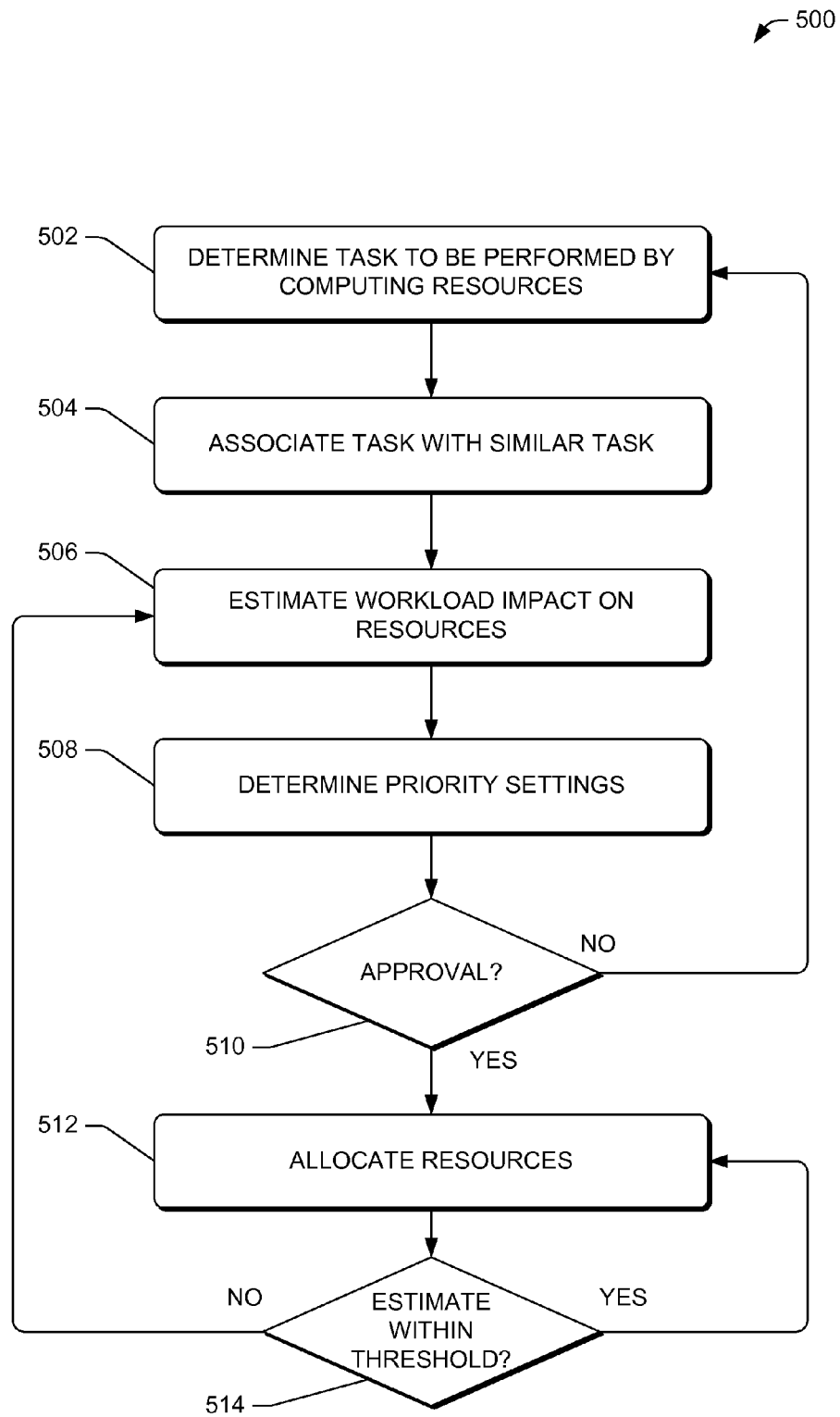
FIG. 5 is a flow diagram of an illustrative process to receive a task and estimate of resource demands for a new task and then allocate computing resources corresponding to an existing model.

FIG. 5 is a flow diagram of an illustrative process 500 to receive a task and estimate of resource demands for a new task and then allocate computing resources corresponding to an existing model.

At 502, the analysis module 124 may determine a task to be performed by the resources 106. In various embodiments, the task may be defined by the client 114 based on a prediction of workload of one of the primary resources (e.g., the primary resource "primary (1)" 314). Thus, the client may not need to be aware of workloads or even processing tasks performed by the resources at other levels (e.g., level 1, level 2, level n, etc.). For example the client 114 may define the task by describing actions performed by the task that are similar to other tasks performed by the resources. In some embodiments, the client 114 may define a task by applying business rules or business logic rather than by identifying the resources necessary to perform the task. For example, the new task may be defined by an association with one or more existing tasks.

At 504, the analysis module 124 may associate the task with at least one similar task. For example, when the new task is very similar or the same as an existing task, then the analysis module 124 may associate the new task with the existing task. However, when the new task includes elements of various tasks, then the analysis module 124 may associate the new task with at least portions of the existing task which are relevant to the new task. In some embodiments, the analysis module 124 may identify, from various tasks, an existing task having a similarity to the new task that is greater than a similarity threshold. The similarity threshold may be a percentage of the resources that are the same, an amount of the calculations that are performed by the same resources, and so forth.

At 506, the analysis module 124 may estimate workload impact on the resources. To estimate the workload impact, the analysis module 124 may receive, possibly at the operation 502, an estimate of the workload from the client 114. The analysis module 124 may then use this estimate to estimate (or predict) the workload impact on the resources. For example, the client 114 may estimate a 30% increase in transaction for an item due to a promotion. The analysis module 124 may estimate that the primary resource for this task may increase workload by an amount X of work while a dependent resource may increase workload by an amount Y. However, the capacity of these resources may be affected in different ways. For example, the amount Y may push the corresponding resource near or to the resource's capacity threshold while the primary resource may be able to absorb the amount X of additional workload without capacity constraints.

At 508, the allocation module 126 may determine priority settings for the new task. The priority setting may be received from the client 114 and/or an administrator of the host 102, and may be associated on the estimates provided by the client 114. In some embodiments, the priorities of other tasks may be revised when a new task is introduced following the operation 502.

At 510, the allocation module 126 may perform an approval inquiry, which may enable an administrator or other person to approve the task based on the data collected in one or more of the operations 502-508. In various embodiments, the approval inquiry may be triggered by an event, such as when the requested task consumes more than a threshold amount of capacity of the resources. When the approval is rejected, following the "no" route from the decision 510, then the process 500 may loop back to the operation 502. When the approval is granted (either automatically or manually), then the process 500 may continue at 512 following the "yes" route from the decision operation 510.

At 512, the allocation module 126 may allocate the resources 106 to perform the new task. In some instances, the allocation module 126 may expand capacity of some of the resources in order to perform the new task. The allocation module 126 may use the priorities form the operation 508 to prioritize the tasks during processing of the various tasks.

At 514, the analysis module may monitor the processing of the new task and determine whether the new task is operating within a threshold range of the estimate. When the new task is not operating within the threshold range of the estimate (either below or above), then the analysis module 124 may reevaluate the estimate at the operation 506 (via the "no" route from the decision operation 514). When the new task is operating within the threshold range of the estimate, then may continue the allocation of resources at the operation 512 (via the "yes" route from the decision operation 514).

In accordance with various embodiments, the loop in the process 500 may enable updating of the model (per the process 400) by analyzing actual workload impacts realized after performance of the new task. Thus, when new resources are deployed (e.g., new hardware, new software, upgrades, etc.), then the resource data 128 may be updated and revised to accurately represent a current state of the resources.

Figure 6:
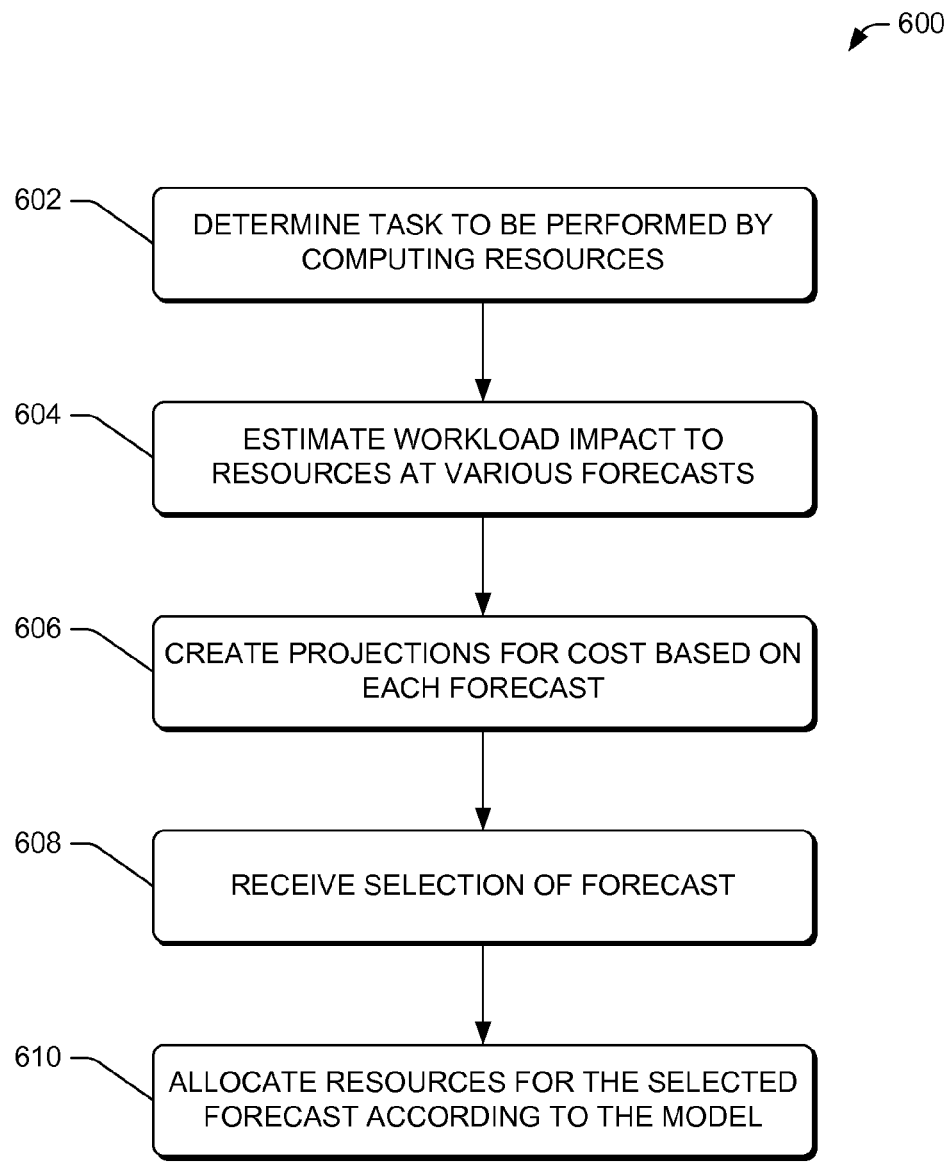
FIG. 6 is a flow diagram of an illustrative process to provide various estimates and costs for a new task, and then allocate computing resources based on a selected estimate.

FIG. 6 is a flow diagram of an illustrative process 600 to provide various estimates and costs for a new task, and then allocate computing resources based on a selected estimate.

At 602, the analysis module 124 may determine a task to be performed by the computing resources, similar to the operation 502 in the process 500.

At 604, the analysis module 124 may estimate workload impact to resources at various forecasts. For example, when the task to be performed is estimated by the client 114 to include 100 transactions per minute (t/min), then the analysis module 124 may determine the workload impact to the resources required to perform the task at various forecasts (or estimates), such as at 75 t/min, at 125 t/min, at 150 t/min, and so forth.

At 606, the analysis module 124 may create projections of costs based on the forecasts from the operation 604. For example, the analysis module 124 may determine that one of the resources necessary to perform the task may be over-utilized when the forecast is 125 t/min or greater. This over-utilization may require adding capacity to the respective resource, which may result in a steep increase in cost for this estimate of workload. In some embodiments, the estimates may also include analysis and/or costs of reallocation of tasks, prioritization of tasks, and/or other impacts and costs of providing the new task at a given forecast.

At 608, the allocation module 126 may receive a selection of a forecast provided in the operation 604. For example, the client 114 may select a forecast, the forecast may be selected based on the cost projections from the operation 606, or the forecast may be selected using other input.

At 610, the allocation module 126 may allocate the resources for the selected forecast according to the model. For example, the allocation module 126 may perform the allocation in a similar manner as described with reference to the operation 512 in the process 500.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
  analyzing a computing system that includes a plurality of computing resources to identify, for various existing tasks, dependencies between the plurality of computing resources when performing each-individual ones of the various existing tasks;
  receiving a new task to be performed by the computing system;
  calculating one or more similarities between the various existing tasks and the new task, individual ones of the similarities comparing the new task and an individual one of the various existing tasks, the comparing based at least in part on comparing the dependencies between the plurality of computing resources required to perform the various existing tasks and the plurality of computing resources required to perform the new task;
  identifying, from the existing various tasks, based at least in part on the one or more calculated similarities, an existing task having a similarity to the new task that is greater than a similarity threshold;
  modeling the new task using the dependencies between the plurality of the computing resources used when performing the identified existing task having the similarity that is greater than the similarity threshold;
  receiving an estimated workload for performing the new task; and
  allocating at least a portion of the plurality of computing resources required to perform the new task based at least in part on the modeling of the new task and the estimated workload for performing the new task.

2. The method as recited in claim 1, wherein the analyzing the computing system further includes determining capacity constraints of individual ones of the plurality of computing resources.

3. The method as recited in claim 1, wherein the new task is a sale of a new item or a promotional item using an electronic marketplace and the existing task is a sale of an existing item using the electronic marketplace.

4. The method as recited in claim 1, further comprising assigning a priority value to the new task, and wherein the allocating is based at least in part on the priority value of the new task.

5. A method, comprising:
  receiving a new task to be performed by a computing system, the computing system including a plurality of computing resources to perform various tasks;
  associating the new task with at least a portion of an existing task from the various tasks, the associating being at least in part in response to a comparison of the computing resources required to perform the existing task and the new task;
  receiving, from a client, an estimated workload on the computing system for performing the new task;

determining whether the plurality of computing resources are available to perform the estimated workload based at least in part on the estimated workload and the associating of the new task and the at least a portion of the existing task; and allocating, at least partly in response to receiving the estimated workload, at least a portion of the plurality of computing resources to perform the new task based at least in part on a current workload utilized by the at a least a portion of the existing task and the estimated workload of the new task after determining that the plurality of computing resources are available to perform the estimated workload.

6. The method as recited in claim 5, wherein the plurality of computing resources include dependencies between individual tasks and other tasks of the computing system, and wherein the allocating allocates dependencies from the at least a portion of the existing task as dependencies for the new task.

7. The method as recited in claim 5, further comprising expanding a capacity of at least one resource that is used by the new task prior to the allocating of the at least a portion of the plurality of computing resources.

8. The method as recited in claim 5, further comprising:
monitoring processing of the new task to determine whether the estimated workload is within a threshold range; and
re-allocating at least a portion of the plurality of computing resources to perform the new task when the estimated workload is not within the threshold range.

9. The method as recited in claim 5, further comprising providing a cost analysis to the client based at least in part on the estimated workload.

10. The method as recited in claim 9, further comprising providing additional workload projections that are different than the estimated workload, wherein individual ones of workload projections includes an associated cost, the workload projections being selectable by the client as an alternative to the estimated workload.

11. The method as recited in claim 5, further comprising analyzing the computing system to determine capacity constraints of individual ones of the plurality of computing resources, and wherein the allocating is based at least in part on the capacity restraints.

12. The method as recited in claim 5, wherein the new task and the existing task are services provided through an electronic marketplace by the computing system.

13. The method as recited in claim 5, further comprising assigning a priority value to the new task, and wherein the allocating is based at least in part on the priority value of the new task.

14. The method as recited in claim 5, further comprising analyzing performance of the new task by the computing system and storing information regarding the performance of the new task, the information for use when allocating the plurality of computing resources for at least one future task.

15. One or more computer-readable media, storing in memory, computer-executable instructions that, when executed on one or more processors, performs acts comprising:
monitoring workload of a computing system that includes a plurality of computing resources and that provides data to users upon request;
receiving a new task to be performed by the computing system;
associating the new task with an existing task performed by the computing system, the associating being based at least in part in response to a comparison between the plurality of computing resources required to perform the new task and the plurality of the computing resources required to perform the existing task;
receiving an estimated workload on the plurality of computing resources as a result of performance of the new task; and allocating, at least partly in response to receiving the estimated workload, at least a portion of the plurality of computing resources to perform the new task based at least in part on a current workload utilized by the existing task and the estimated workload of the new task.

16. The one or more computer-readable media as recited in claim 15, wherein the acts further comprise expanding a capacity of at least one resource that is used to perform the new task prior to the allocating.

17. The one or more computer-readable media as recited in claim 15, wherein the acts further comprise:
monitoring processing of the new task to determine whether the estimated workload is within a threshold range; and
re-allocating at least a portion of the plurality of computing resources when the estimated workload is not within the threshold range.

18. The one or more computer-readable media as recited in claim 15, wherein the acts further comprise providing a cost analysis of the estimated workload and other workload projections that are greater than or less than the estimated workload, the other workload projections being selectable by a client as an alternative to the estimated workload.

19. The one or more computer-readable media as recited in claim 15, wherein the acts further comprise analyzing the computing system to determine capacity constraints of individual ones of the plurality of computing resources, and wherein the allocating is based at least in part on the capacity constraints.

20. The one or more computer-readable media as recited in claim 15, wherein the new task and the existing task are services provided by at least one of a financial service provider, an electronic marketplace, or a digital media provider using the computing system.

* * * * *